United States Patent
Poelling et al.

(10) Patent No.: US 11,895,949 B2
(45) Date of Patent: Feb. 13, 2024

(54) CLEANING DEVICE IN A COMBINE HARVESTER

(71) Applicant: CLAAS Selbstfahrende Erntemaschinen GmbH, Harsewinkel (DE)

(72) Inventors: Benedikt Poelling, Coesfeld (DE); Norbert Strieker, Verl (DE); Dennis Lutterbeck, Telgte (DE); Joachim Baumgarten, Beelen (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 814 days.

(21) Appl. No.: 17/027,893

(22) Filed: Sep. 22, 2020

(65) Prior Publication Data

US 2021/0084818 A1 Mar. 25, 2021

(30) Foreign Application Priority Data

Sep. 23, 2019 (DE) .......................... 102019125500.7

(51) Int. Cl.
*A01D 41/127* (2006.01)
*A01F 12/44* (2006.01)

(52) U.S. Cl.
CPC ..... *A01D 41/1276* (2013.01); *A01D 41/1272* (2013.01); *A01D 41/1274* (2013.01); *A01D 41/1277* (2013.01); *A01F 12/448* (2013.01)

(58) Field of Classification Search
CPC ............ A01D 41/1276; A01D 41/1272; A01D 41/1274; A01D 41/1277; A01D 75/282; A01F 12/448
See application file for complete search history.

(56) References Cited

U.S. PATENT DOCUMENTS

| 4,598,718 A | * | 7/1986 | Glaubitz | .............. | A01D 75/282 |
| | | | | | 209/416 |
| 4,751,932 A | * | 6/1988 | Busboom | .............. | A01D 75/282 |
| | | | | | 460/9 |

(Continued)

FOREIGN PATENT DOCUMENTS

| DE | 19908696 C1 | 10/2000 | | |
| DE | 10162357 A1 | * 7/2003 | ........... | A01D 41/127 |

(Continued)

OTHER PUBLICATIONS

European Search Report dated Dec. 16, 2020 issued in European Application No. 20 18 6189 (with English translation of the relevant parts).

*Primary Examiner* — Arpad Fabian-Kovacs
(74) *Attorney, Agent, or Firm* — Collard & Roe, P.C.

(57) ABSTRACT

A method and an apparatus for separating a crop flow on at least one conveying and cleaning unit, particularly a top sieve, of a combine harvester, wherein the conveying and cleaning unit is excited to a longitudinal oscillation and a transverse oscillation. The transverse oscillation is controlled depending on at least one state, wherein least one state for controlling the transverse oscillation is the inclination of the combine harvester, wherein at least one further state for controlling the transverse oscillation is the grain purity, particularly the grain purity of a main crop flow. The transverse oscillation is pre-controlled depending on the inclination of the combine harvester and fine-tuned depending on the grain purity.

14 Claims, 5 Drawing Sheets

(56) References Cited

U.S. PATENT DOCUMENTS

| | | | |
|---|---|---|---|
| 7,322,882 B2 | 1/2008 | Duquesne et al. | |
| 7,553,226 B2 * | 6/2009 | Dhont | A01D 75/282 460/101 |
| 7,927,199 B2 * | 4/2011 | Adamson | A01F 12/448 460/101 |
| 8,939,829 B2 * | 1/2015 | Murray | A01F 12/448 460/101 |
| 9,648,807 B2 | 5/2017 | Escher et al. | |
| 9,795,082 B2 | 10/2017 | Middelberg et al. | |
| 9,814,184 B2 * | 11/2017 | Ricketts | A01F 12/446 |
| 9,844,186 B2 * | 12/2017 | Walter | A01F 12/32 |
| 9,980,433 B2 * | 5/2018 | Duquesne | A01F 12/444 |
| 10,925,211 B2 * | 2/2021 | Muench | A01D 41/127 |
| 11,723,309 B2 * | 8/2023 | Reinecke | A01F 12/448 701/50 |
| 2005/0282601 A1 * | 12/2005 | Duquesne | A01F 12/448 460/101 |
| 2006/0229119 A1 * | 10/2006 | Wamhof | A01D 75/282 460/101 |
| 2013/0172057 A1 * | 7/2013 | Farley | A01D 75/282 460/5 |
| 2015/0080070 A1 * | 3/2015 | Johnson | A01D 41/1273 460/5 |
| 2015/0342119 A1 * | 12/2015 | Duquesne | A01F 12/38 700/280 |
| 2016/0000008 A1 * | 1/2016 | Schøler | A01D 41/1272 56/10.2 R |
| 2017/0150680 A1 * | 6/2017 | Moutton | G01F 23/263 |
| 2017/0265397 A1 * | 9/2017 | Johnson | A01F 12/448 |

FOREIGN PATENT DOCUMENTS

| | | | | |
|---|---|---|---|---|
| DE | 102004023767 A1 | | 11/2005 | |
| DE | 102011051215 A1 | * | 12/2012 | ......... A01D 41/1276 |
| DE | 102013107169 A1 | * | 1/2015 | ........... A01D 41/127 |
| DE | 102013107169 A1 | | 1/2015 | |
| DE | 102014102789 A1 | | 9/2015 | |
| DE | 102016203079 A1 | * | 9/2017 | ......... A01D 41/1272 |
| EP | 1479280 A1 | * | 11/2004 | ......... A01D 41/1276 |
| EP | 1479280 A1 | | 11/2004 | |
| EP | 1595435 A1 | | 11/2005 | |
| EP | 1609352 A1 | | 12/2005 | |
| EP | 2510777 A1 | | 10/2012 | |
| EP | 2550852 A1 | * | 1/2013 | ......... A01D 41/1276 |
| JP | 2012205574 A | * | 10/2012 | ......... A01D 41/1276 |

* cited by examiner

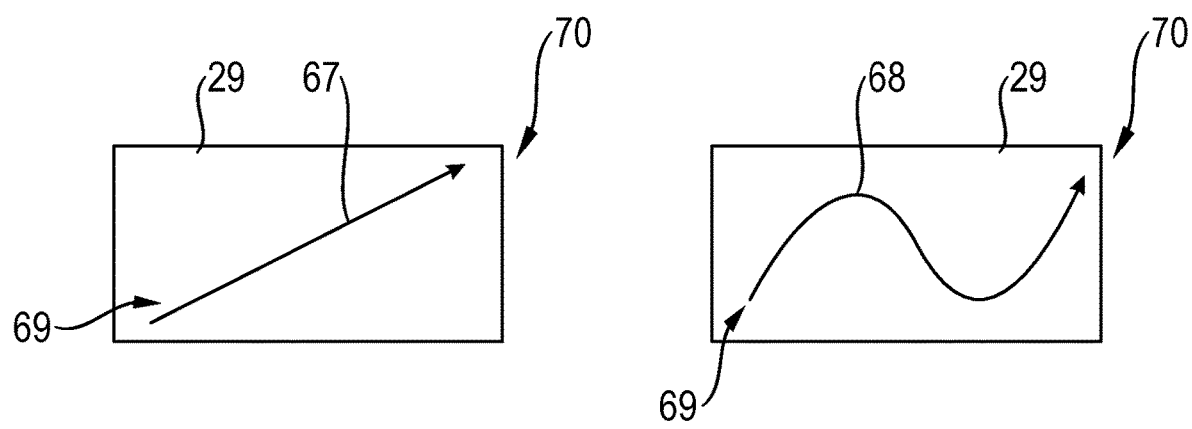
Fig. 5a     Fig. 5b

CLEANING DEVICE IN A COMBINE HARVESTER

CROSS-REFERENCE TO RELATED APPLICATIONS

This application claims priority under 35 USC 119 of German Application No. DE 10 2019 125 500.7, filed on Sep. 23, 2019, the disclosure of which is herein incorporated by reference.

BACKGROUND OF THE INVENTION

The invention is directed to a method and an apparatus for separating a flow of harvested material on at least one conveying and cleaning unit of a combine harvester.

In combine harvesters, there is a problem in that the crop loads one side of the conveying and cleaning units when threshing on slopes, because the crop slides to one side of the conveying and cleaning units when the machine tilts to the side. This minimizes the cleaning effect due to the accumulation of crop in clumps on one side.

A method and an apparatus for solving the problem are known from EP 1 595 435 B1. In the method and apparatus, the conveying and cleaning unit is excited to a longitudinal oscillation and a transverse oscillation by at least one oscillating drive. The transverse oscillation is initially pre-controlled depending on the inclination of the combine harvester and is subsequently fine-tuned depending on the grain flows measured over the width of the sieves of the conveying and cleaning unit transverse to the driving direction. The transverse oscillation conveys the crop transverse to the driving direction of the combine harvester in order to achieve a uniform distribution of the crop on the conveying and cleaning unit.

The problem to be redressed by the invention consists in that, as a result of the transverse oscillation, elongate non-grain constituent parts, for example, chaff, align lengthwise with the sieve louvers of the sieves of the conveying and cleaning unit and fall through freely. Consequently, the transverse oscillation results in a reduced grain purity of a main crop flow owing to the presence of an increased amount of non-grain constituent parts. Therefore, as the feed of crop transverse to the driving direction caused by the transverse oscillation increases, the proportion of non-grain constituent parts in the main crop flow likewise increases.

SUMMARY OF THE INVENTION

Therefore, it is the object of the invention to avoid the aforementioned disadvantages of the prior art and in particular to prevent transverse oscillations which lead to an excessive and unwanted amount of non-grain constituent parts in the main crop flow.

This object is met according to the invention by a method for separating a crop flow on at least one conveying and cleaning unit, particularly a top sieve, of a combine harvester, wherein the conveying and cleaning unit is excited to a longitudinal oscillation and a transverse oscillation, the transverse oscillation is controlled depending on at least one state, and at least one state for controlling the transverse oscillation is the inclination of the combine harvester.

According to the invention, at least one further state for controlling the transverse oscillation is the grain purity, particularly the grain purity of a main crop flow. The transverse oscillation is pre-controlled depending on the inclination of the combine harvester and fine-tuned depending on the grain purity. Accordingly, when a grain purity is too low, the transverse oscillation of the top sieve is reduced so that fewer non-grain constituent parts are aligned lengthwise with respect to the sieve louvers as a result of the transverse oscillation. Further, when a high grain purity is determined, the transverse oscillation can likewise be additionally increased in order to achieve the desired distribution of the crop on the top sieve more rapidly.

In an advantageous configuration, the grain purity is determined by means of one or more first sensors, preferably optical sensors. Optical sensors are particularly well suited to determine the grain purity by means of image analysis.

In particular, the conveying and cleaning unit can be acted upon by an active transverse oscillation during a work process on level ground as well as on a slope, and the distance covered by the crop on the conveying and cleaning unit is actively lengthened. An active lengthening of the distance covered by the crop on the conveying and cleaning unit is particularly advantageous because this results in a longer distance for the separating process. An alternating transverse conveying direction brought about by an active transverse oscillation, for example, during a harvesting process on level ground, leads to an active lengthening of the distance covered by the crop on the conveying and cleaning unit compared to a conveying of the crop directed exclusively in driving direction.

In an advantageous configuration, at least one further state for controlling the transverse oscillation can be a transverse separation, particularly a transverse separation at one or more sieves of the conveying and cleaning unit. The transverse oscillation can be controlled by means of the transverse separation such that a desired distribution of the crop, particularly a uniform distribution, on the conveying and cleaning unit can be achieved.

The transverse separation can preferably be determined at the exit of one or more sieves of the conveying and cleaning unit by one or more grain flow measuring devices. It is particularly advantageous to determine the transverse separation at the exit of the sieves because a distribution of the crop resulting from the transverse oscillation has already formed at this location.

An advantageous further development provides that the combine harvester is formed as axial rotor machine which has at least one axial rotor and louvers which at least partially surround the rotor. A further state for controlling the transverse separation is an adjustment of the louvers. The adjustment of the louvers is changed by the control depending on at least one further state. This is particularly advantageous because the crop can already be strategically positioned before reaching the conveying and cleaning unit as a result of the adjustment of the louvers in order to afford a better starting position for the method. For example, this makes it possible for the active lengthening of the distance covered by the crop on the conveying and cleaning unit to guide the crop preferably in direction of a determined region of the conveying and cleaning unit that is well suited as starting position for the active lengthening.

In a particularly advantageous further development, the control of the transverse oscillation is carried out automatically so that the driver need not intervene in the control.

It is advantageous when a further state for controlling the transverse oscillation is the throughput of the crop flow. The conveying and cleaning unit can be acted upon by the transverse oscillation, when necessary, by means of the throughput of the crop flow so that the conveying and cleaning unit is acted upon by the transverse oscillation only when crop is located on the conveying and cleaning unit. Wear and energy consumption can be reduced in this way.

In the apparatus according to the invention, the combine harvester comprises one or more first sensors for determining the grain purity and a control unit for controlling the transverse oscillation. The control unit controls the transverse oscillation depending on at least one state. At least one state for controlling the transverse oscillation is the inclination of the combine harvester, and at least one further state is the grain purity. The control unit pre-adjusts to a transverse oscillation reference value depending on the inclination of the combine harvester and subsequently, depending on the at least one further state, particularly the grain purity, generates a control command signal with which the transverse oscillation of the conveying and cleaning unit is adjusted so that the grain purity lies within a defined tolerance range.

The first sensors are advantageously formed as optical sensors for capturing series of images of a through-going crop flow. The optical sensors are preferably arranged in the grain elevator because the crop which is separated in the conveying and cleaning unit is conveyed through this grain elevator and an arrangement of this kind is therefore particularly well suited for measuring grain purity.

In an advantageous configuration, the combine harvester comprises at least one grain flow measuring device for determining the transverse separation, and at least one further state for controlling the transverse oscillation is the transverse separation. Determining the transverse separation is particularly advantageous because this is a measure of the distribution of the crop on the conveying and cleaning unit which substantially influences the separation of the crop on the conveying and cleaning unit.

In a particularly advantageous further development, the combine harvester can be formed as an axial rotor machine, and the axial rotor machine has at least one axial rotor and louvers at least partially surrounding the latter, and at least one further state for controlling the transverse oscillation is an adjustment of the louvers. In particular, the control unit can be adapted to control the adjustment of the louvers, and the control changes the adjustment of the louvers depending on at least one of the states. A controlling of the adjustment of the louvers offers the advantage that, even before reaching the conveying and cleaning unit, the crop can be guided in a direction which is particularly well suited for an optimal separation at the conveying and cleaning unit.

In an advantageous configuration, the combine harvester can have a throughput measuring device, particularly a layer height roller arranged in a feed conveyor of the combine harvester, for determining the throughput of the crop flow. At least one further state for controlling the transverse oscillation (Q) is the throughput of the crop flow so that the conveying and cleaning unit is only acted upon by transverse oscillation when crop is present on the conveying and cleaning unit.

BRIEF DESCRIPTION OF THE DRAWINGS

Further advantageous configurations are the subject matter of further subclaims and are described in the following referring to an embodiment example depicted in a number of figures. In the drawings:

FIG. 5a shows a schematic view of the top sieve illustrating a first variant of the distance covered by the crop on the top sieve; and FIG. 5b shows a schematic view of the top sieve illustrating a second variant of the distance covered by the crop on the top sieve.

DETAILED DESCRIPTION OF THE EMBODIMENTS

Figure 1:
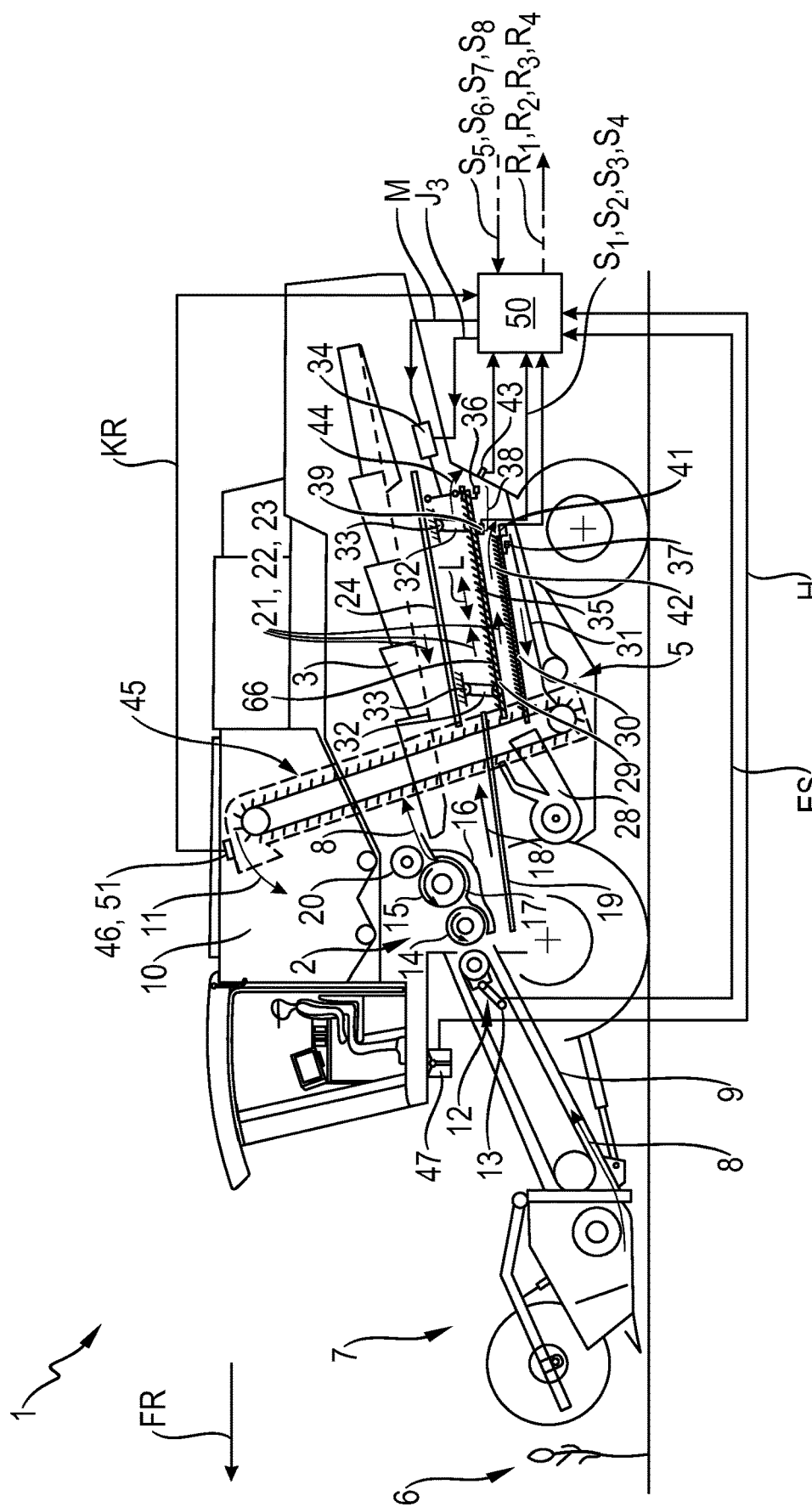
FIG. 1 shows a schematic side view of a combine harvester.

The embodiment example of the invention shown in FIG. 1 is a self-propelled combine harvester 1 with a tangential thresher 2 and a shaking screen 3 downstream thereof. The combine harvester 1 can also be outfitted with an axial rotor 4 instead of a shaking screen 3. A conveying and cleaning device 5 is located below the shaking screen 3.

The operation of a combine harvester 1 of this type will be described in the following. The crop 6 is initially collected by a cutter 7. The collected crop 6 forms a crop flow 8 which is transferred from the cutter 7 to a feed conveyor 9.

In the present case, "crop flow 8" of the combine harvester 1 means the stream of processed crop 6 on the crop transport path of the combine harvester 1. Specifically in the combine harvester 1, the crop transport path starts in the cutter 7 and leads in all cases to the grain tank 10 of the combine harvester 1. The term "main crop flow 11" refers to that portion of the crop flow 8 which forms the majority of the harvested material with respect to the crop transport path overall.

The throughput measuring device 12 is arranged in the feed conveyor 9 and can have a layer height roller 13 which is known per se, for example, from DE 10 2014 102 789 A1 and is therefore not described in more detail and by means of which the throughput of the crop flow 8 is determined.

The feed conveyor 9 transfers the crop 6 in its rear region to the threshing elements 14, 15, 16 of the tangential thresher 2.

A pre-acceleration drum 14 is located at the input of the tangential thresher 2, and a threshing drum 15 is arranged downstream of the pre-acceleration drum 14 in the material flow direction. The pre-acceleration drum 14 and the threshing drum 15 are at least partially enclosed by a threshing concave 16 at the lower side.

The crop 6 exiting the feed conveyor 9 is collected by the pre-acceleration drum 14 and drawn by the threshing drum 15 through the threshing gap 17 formed between the threshing drum 15 and the threshing concave. In so doing, the threshing drum 15 mechanically processes the crop 6. Subsequently, a grain/chaff mixture 18 is separated at the threshing concave 16 and is fed to the cleaning device 5 via an oscillatingly driven preparation floor 19 in order to separate the grains from the non-grain constituent parts, i.e., stalk parts and chaff parts. The crop flow 8 which substantially comprises threshed stalks passes from the thresher 2 via the beater 20 rotating counterclockwise to the shaking screen 3 which conveys the crop flow 8 into the rear region of the combine harvester 1. The grains 21 and possibly short straw 22 and chaff 16 still remaining in the crop flow 8 are separated in that they fall through the shaking screen 3 onto a return pan 24.

Figure 2:
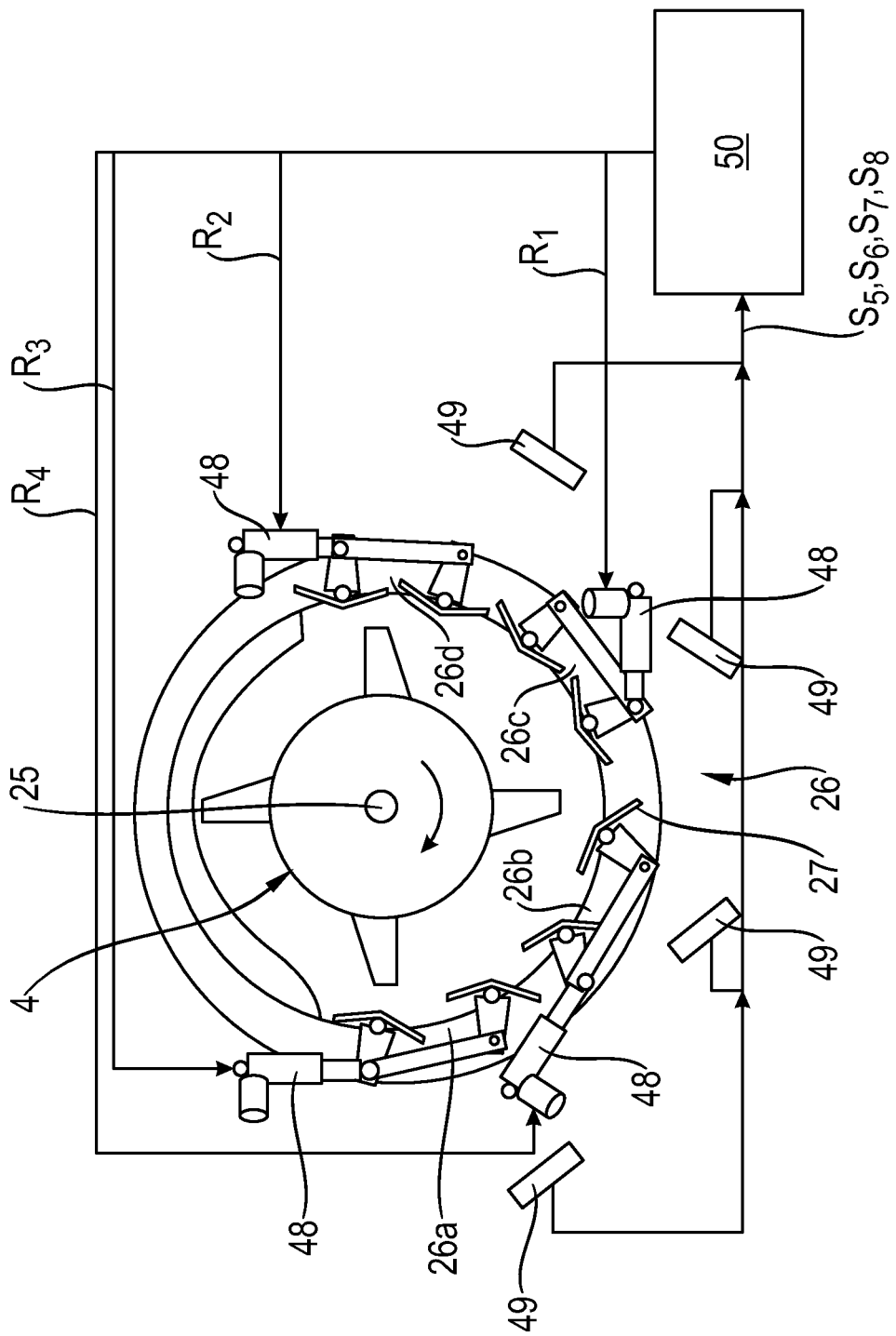
FIG. 2 shows a schematic side view of an axial rotor.

In the case of a combine harvester 1 outfitted with an axial rotor 4 which is known, for example, from EP 1 479 280 A1, the crop 6 passes via the beater 20 to the axial rotor 4 which, in this case, conveys the crop flow 8 into the rear region of the combine harvester 1. An exemplary axial rotor 4, known per se, is shown in FIG. 2. Particulars with respect to the construction of the axial rotor 4 are described in detail in EP 1 479 280 A1, the disclosure of which is herein incorporated by reference, and the construction need not be described in detail again in the following. The axial rotor 4 is partially enclosed by a separating surface 26 which comprises a plurality of louvers 27 staggered in circumferential direction. The louvers 27 are swivelable, respectively, around an axis parallel to the longitudinal axis 25 of the axial rotor 4. In the construction shown in FIG. 2, the louvers 27 are combined in four groups controlled, respectively, by a common linear actuator 48. That is, the separating surface 26 is divided transverse to the conveying direction into four segments 26a, 26b, 26c, 26d, each of which corresponds to a group of louvers 27, the penetrability of the segments 26a, 26b, 26c, 26d being individually adjustable by swiveling the louvers 27. Grain sensors 49 are arranged around the separating surface 26 in such a way that they are impinged by grains 21 exiting at one of the segments 26a-26d. A control unit 50 in the form of a CPU connected to the grain sensors 49 determines the amount of grain exiting at the respective segment from the grain flow signals S5, S6, S7, S8 of the grain sensors 49. The constituent parts (grains 21, short straw 22 and chaff 23) separated at the separating surface 26 are guided in direction of the return pan via the louvers 27.

The return pan 24 transports grains 21, short straw 22 and chaff 23 to the preparation floor 19 from which they pass into the conveying and cleaning device 5. The conveying and cleaning device 5 comprises a fan 28, conveying and cleaning units 29, 30, which comprise a top sieve 29 and a bottom sieve 30, and the grain return pan 31.

The top sieve 29 is bearing-supported so as to be moveable in the combine harvester 1 approximately horizontally in all directions by means of links 32, ball joint bearings 29 being arranged at the ends thereof. The top sieve 29 is excited to a longitudinal oscillation L and a transverse oscillation Q running transverse to the latter via two oscillating drives 24, shown schematically, which are coupled to one another and which are known from DE 199 08 696 and therefore not described more fully.

Alternatively, however, it is also possible and generally known to arrange the top sieve 29 and bottom sieve 30 together in a sieve shoe (not shown) and that the sieve shoe, including the top sieve 29 and the bottom sieve 30, is excited by the oscillating drives 34 to execute a transverse oscillation Q and a longitudinal oscillation L.

Another alternative consists in arranging only one oscillating drive 34 for exciting a longitudinal oscillation L and, in addition, a swiveling device (not shown) at the top sieve 29 by which the top sieve 29 is acted upon by a transverse oscillation Q. An arrangement of this kind is known, for example, from EP 1 609 352 B1, the disclosure of which is herein incorporated by reference, and is therefore not explained in more detail.

The construction in which only the top sieve 29 is acted upon by a transverse oscillation Q will be described in more detail in the following.

The longitudinal oscillation L of the top sieve 29 accelerates the crop 6 which is located on the latter and which substantially comprises grains 21, short straw 22 and chaff 23 opposite the driving direction FR of the combine harvester 1 so as to convey it via the top sieve 29 into the rear region of the combine harvester 1. The transverse oscillation Q (see FIG. 3) accelerates the grains 21, short straw 22 and chaff 23 transverse to the driving direction FR of the combine harvester 1 so that the crop 6 which has slid downward while the combine harvester 1 drives along the slope is uniformly distributed over the width of the top sieve 29.

The separation of the grains 21 from the short straw 22 and chaff 23 is carried out such that an air flow is guided upward from below by the fan 28 through the sieve openings 35 of the top sieve 29 which are located between sieve louvers 66 arranged on the sieves 29, 30. This air flow loosens the crop flow 8 guided over the top sieve 29 and ensures that the chaff 23 which is specifically lighter and the short straw portions 22 are separated out, while the heavy harvested grain material falls through the sieve openings 35.

The separation at the bottom sieve 30 is carried out analogous to the separation at the top sieve 29. Depending on the construction of the conveying and cleaning units, the bottom sieve 30 can be acted upon by both a transverse oscillation Q and a longitudinal oscillation L or only by a longitudinal oscillation L.

The top sieve 29 and bottom sieve 30 are arranged partially one above the other so that the crop 21, 22, 23 is sieved in varying degrees of fineness in two stages. The sieve openings 35 of the top sieve 29 and bottom sieve 30 are adjustable via actuating elements 36, 37. The top sieve 29 is generally constructed such that it has a larger mesh width in its rear region or returns region 38.

A first grain flow measuring device 39 which will be described in more detail later is arranged below the top sieve 29 in the returns region 38 in order to determine a transverse separation A (see FIG. 3), which describes the separation over the width of the sieve of a sieve through-pass 40 that has fallen through the sieve openings 35 of the top sieve 29. A second grain flow measuring device 41 which determines a transverse separation A of a sieve overflow 42 guided over the bottom sieve 30 and/or of the sieve through-pass 40 that has fallen through the sieve openings 35 of the top sieve 29 can be arranged below the first grain flow measuring device 39 at the end of the bottom sieve 30. Further, a third grain flow measuring device 43 can be arranged at the end of the top sieve 29 by which the transverse separation A of a sieve loss 44 that has not fallen through the top sieve 29 can be determined. The grain flow measuring devices 39, 41, 43 are arranged, respectively, in a region of the sieves 29, 30 in which the distribution of the crop 21, 22, 23 is already carried out over the entire width of the sieves 29, 30.

Finally, a grain elevator 45 guides the crop flow 8 from the conveying and cleaning device 5 to the grain tank 10.

An optical sensor device 46 is used in the grain elevator 45, which optical sensor device 46 has first sensors 51 for capturing a series of images of the main crop flow 11 passing through the grain elevator 45 for determining a non-grain proportion and/or a broken grain proportion of the main crop flow 11 based on a series of captured images. An optical sensor device 46 of this kind has already been described in detail in DE 10 2013 107 169 A1. Therefore, its construction need not be described again in the following.

The term "broken grain proportion" or "non-grain proportion" means the proportion of broken grains out of all of the grains in the crop flow 8 on the one hand and the proportion of material in the crop flow 8 that is not grain within the meaning of crop 6 on the other hand. Accordingly, the non-grain proportion can also include material that is really also grain but not grain of the crop 6 actually harvested. This broken grain proportion and/or non-grain proportion can refer to the image area that has just been acquired by the image series or to a determined partial volume of the crop flow that has just been acquired. However, it is preferable that the broken grain proportion and/or the non-grain proportion refers to a throughput of the main crop flow 11 as guided through the combine harvester 1.

In addition, a transverse inclination sensor 47 is arranged at the combine harvester 1. The transverse inclination sensor 47 senses the transverse inclination of the combine harvester 1 and, accordingly, the transverse inclination of the conveying and cleaning units 29, 30 in a manner known per se.

The grain flow measuring devices 39, 41, 43, the optical sensor device 46, the throughput measuring device 12, the transverse inclination sensor 47, in addition to the grain sensors 49, are likewise connected to the control unit 50 with which the transverse oscillation Q of the oscillating drive and the linear actuators 48 for adjusting the louvers 27 are controlled in a manner to be described in more detail.

Figure 3:
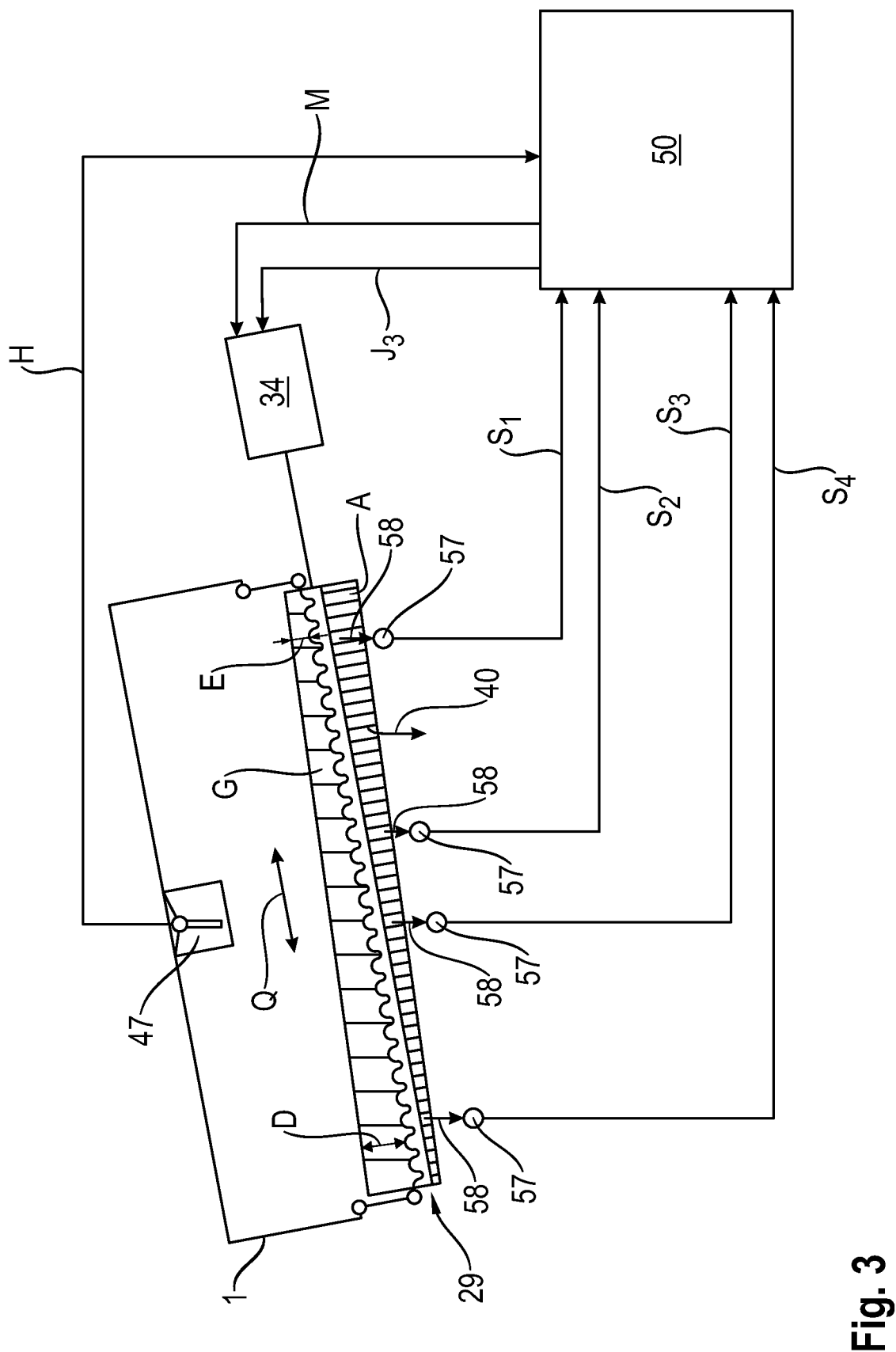
FIG. 3 shows a schematic section of a rear view of a combine harvester with the top sieve.

FIG. 3 shows a section of a rear view of the top sieve 29 of a combine harvester 1 harvesting on a slope. As a result of the inclined position of the combine harvester 1, the crop 21, 22, 23 conveyed on the sieves 29, 30 slides downward as a result of gravity, which leads to unevenly distributed material distributions G—shown schematically in FIG. 3—of the crop 21, 22, 23 on the sieves 29, 30. The uneven material distribution G brings about a poor separating effect on the crop 21, 22, 23 in the area with large material layer thickness D compared with an area with a small material layer thickness E in which a substantial separating effect is achieved so that the sieves 29, 30 do not work efficiently in all places. As a result, there is an unevenly distributed transverse separation A—shown schematically in FIG. 3—over the width of the sieves 29, 30, the curve of this transverse separation A being determined by the geometry of the associated material distribution G. The aim of the apparatus according to the invention is to achieve a uniformly distributed material distribution G, i.e., a homogeneous material layer thickness D, over the width of the top sieve 29 by means of the transverse oscillation Q, which leads to an equally large separating effect such that the transverse separation A is constant over the width of the top sieve 29.

The first grain flow measuring device 39 which is arranged below the top sieve 29 comprises a plurality of pulse density sensors 57. A grain flow measuring device 39 of this kind has already been described in detail in EP 1 595 435 B1 and is therefore not described in more detail. When impinged by grain flows 58, the pulse density sensors 57 generate grain flow signals S1, S2, S3, S4 which change proportionally to the grain flows 58.

The transverse inclination sensor 47 generates an inclination signal H which changes proportionally to the change in the inclination of the combine harvester 1 on the slope. The grain flow signals S1, S2, S3, S4 generated by the pulse density sensors 57 and the inclination signal generated by the transverse inclination sensor 47 are transmitted to the control unit 50. A first separating curve q which is stored in the control unit 50 and which corresponds to the transverse separation A of the top sieve 29 (see FIG. 4) is associated with the grain flow signals S1, S2, S3, S4 by the control unit 50. The separating curve q may have been determined, for example, through a series of empirical trials and defines the grain throughput along the width of the top sieve 29.

Figure 4:
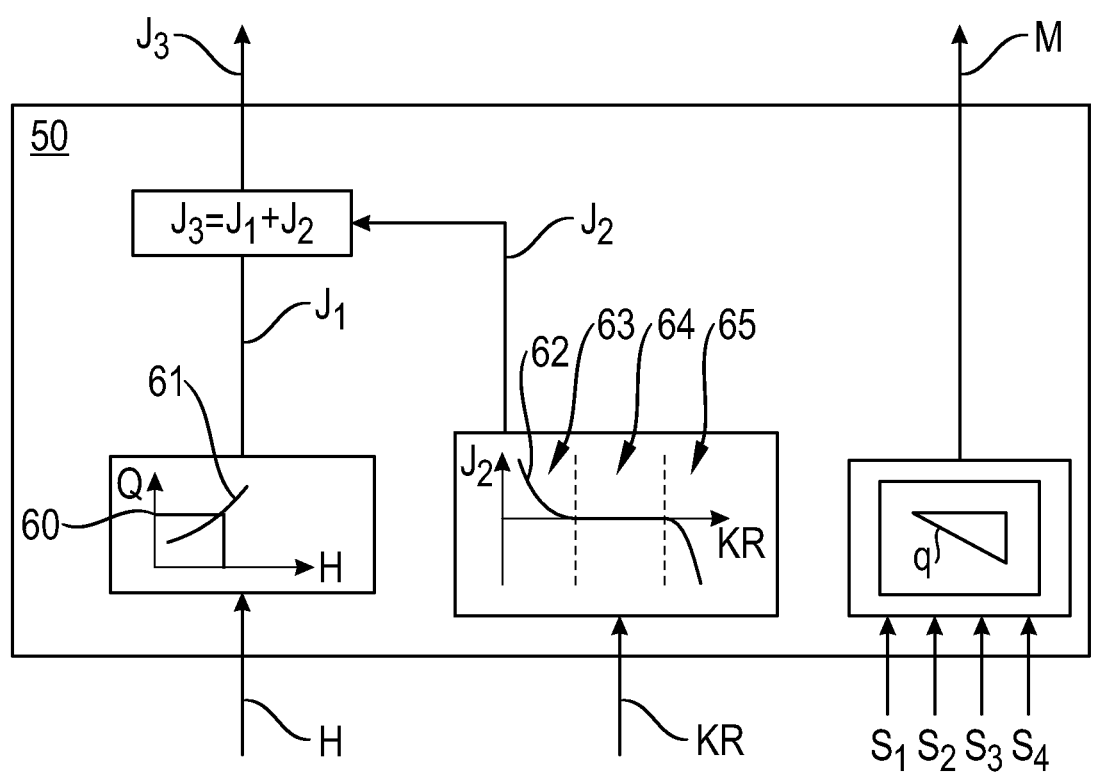
FIG. 4 shows a schematic program flow chart illustrating the control.

A flowchart of the control of the transverse oscillation is shown in FIG. 4. As in the method which is already known from EP 1 595 435 B1, the control unit 50 roughly pre-controls the transverse oscillation Q of the top sieve 29 automatically depending on the inclination of the combine harvester 1. The control unit 50 generates a first control command signal J1 depending on the inclination signal H. The first control command signal J1 is used for pre-adjusting the transverse oscillation Q of the top sieve 29 to a reference value 60 of the transverse oscillation stored in a first characteristic curve 61 in the control unit 50.

According to the invention, a second control command signal J2 is generated for fine-tuning the transverse oscillation Q depending on the grain purity KR which is determined at the optical sensor device 46 and which corresponds to the non-grain proportion of the main crop flow 11. The fine control is carried out in the embodiment example by adding the first control command signal J1 and second control command signal J2, the sum of which gives a third control command signal J3. For this purpose, a second characteristic curve 62 is stored in the control unit 50. The second characteristic curve 62 defines the second control command signal J2 depending on the grain purity KR. This dependency is divided into three ranges 63, 64, 65 in the embodiment example.

In the first range 63, in which there is a high grain purity KR and accordingly few non-grain constituent parts contained in the main crop flow 11, the second control command signal J2 takes on a positive value. The reason for this is that when the transverse oscillation Q is too high the non-grain constituent parts align themselves lengthwise with respect to the sieve louvers 66 of the top sieve 29 and fall through freely. In case of a high grain purity KR, the proportion of non-grain constituent parts which align themselves lengthwise with respect to the sieve louvers 66 as a result of the transverse oscillation Q is small. Consequently, an increase in the transverse oscillation Q resulting from a positive value for J2 is not problematic. Accordingly, an additional strengthening of the transverse oscillation Q is effected by means of the positive value of the second control command signal J2 in the first range 62.

In the second range 64, the grain purity KR is in a reference range defined, for example, from iterative trials. In this case, there is no additional change provided in the transverse oscillation Q depending on the grain purity and, therefore, the value defined for J2 in this second range 64 is equal to zero.

In the third range 65, the grain purity KR is low. In this case, there is a high proportion of non-grain constituent parts in the main crop flow 11. The high proportion of non-grain constituent parts is to be ascribed to the problems described above with respect to the aligning of the non-grain constituent parts lengthwise along the sieve louvers 66. For this reason, a negative value of J2 results in an additional reduction in the transverse oscillation Q.

The actuator 34 is controlled with the generated third control command signal J3 for transverse oscillation Q to impinge on the top sieve 29.

Subsequently, the control unit 50 readjusts the transverse oscillation Q automatically depending on the transverse separation A of the top sieve 29 with approximately constant slope inclination, and the third control command signal J3 is overdriven. For this purpose, the control unit 50 generates a fourth control command signal M depending on the transverse separation A with which the transverse oscillation Q is controlled such that the transverse separation A is constant.

In a further configuration of the method according to the invention, the fourth control command signal M is fine-tuned for controlling the transverse oscillation Q depending on the transverse separation A of the top sieve 29 analogous to the fine tuning of the first control command signal J1, likewise depending on the grain purity KR. The fourth control command signal M is reduced when grain purity KR is too low so that the transverse oscillation Q generated thereby is reduced.

In a further configuration of the method, the transverse oscillation Q is controlled in such a way that the distance 67, 68 covered by the crop 21, 22, 23 on the top sieve 29 is actively lengthened. In this way, more grains 21 are separated from the crop 21, 22, 23. FIG. 5a and FIG. 5b schematically show two exemplary curves of the distance 67, 68 of the crop 21, 22, 23 over the top sieve 29. The crop 21, 22, 23 is conveyed (see FIG. 5a) transversely over the top sieve 29, e.g., from a front initial region 69 located in driving direction FR in direction of a rear end region 70 located opposite the latter. Alternative curves of distance 67, for example, a sine-shaped curve of distance 68 shown in FIG. 5b, also lie within the scope of the method according to the invention. The control of this active lengthening of the covered distance 67, 68 by the control device 50 is likewise carried out within previously established limits which relate to grain purity KR, slope inclination and transverse separation A and were determined, for example, through iterative trials.

In the case of a combine harvester 1 (see FIG. 2) outfitted with an axial rotor 4, the louvers 27 are controlled by the control device 50 in such a way that the crop 21, 22, 23 is conveyed primarily in direction of the initial region 69 for the active lengthening of the distance 67, 68 on the top sieve 29 by the respective position of the louvers 17. For this purpose, control signals R1, R2, R3, R4 for controlling the linear actuators 48 are generated depending on grain flow signals S5, S6, S7, S8.

It is further provided that the transverse oscillation Q of the top sieve 29 is controlled automatically depending on the throughput of the crop flow 8. For this purpose, a crop flow signal ES is generated by means of the throughput measuring device 12, and the control device 50 determines the throughput of the crop flow 8 based on this crop flow signal ES. When the throughput falls below a limiting value, the transverse oscillation Q is reduced or switched off and, when the limiting value is exceeded, it is reactivated.

All of the features realized in connection with the embodiment example described herein can also be advantageous individually in principle and are not limited to the combination of features presented herein to the extent that the features are not combined in the independent claims.

REFERENCE CHARACTERS 1 combine harvester
2 tangential thresher
3 shaking screen
4 axial rotor
5 conveying and cleaning device
6 crop
7 cutter
8 crop flow
9 feed conveyor
10 grain tank
11 main crop flow
12 throughput measuring device
13 layer height roller
14 pre-acceleration drum
15 threshing drum
16 threshing concave
17 threshing gap
18 grain/chaff mixture
19 preparation floor
20 beater
21 grains
22 short straw
23 chaff
24 return pan
25 longitudinal axis
26 separating surface
26a segment
26b segment
26c segment
26d segment
27 louvers
28 fan
29 top sieve
30 bottom sieve
31 grain return pan
32 link
33 ball joint bearing
34 oscillating drive
35 sieve openings
36 actuating element
37 actuating element
38 returns region
39 first grain flow measuring device
40 sieve through-pass
41 second grain flow measuring device
42 sieve overflow
43 third grain flow measuring device
44 sieve loss
45 grain elevator
46 optical sensor device
47 transverse inclination sensor
48 linear actuator
49 grain sensors
50 control unit
51 first sensors
57 pulse density sensors
58 grain flow
60 transverse oscillation reference value
61 first characteristic curve
62 second characteristic curve
63 first range
64 second range
65 third range
66 sieve louver
67 distance
68 distance
69 initial region
70 end region
A transverse separation
D material layer thickness
G material distribution
H inclination signal
L longitudinal oscillation
M fourth control command signal
q separating curve
Q transverse oscillation
ES crop flow signal
FR driving direction
KR grain purity
S1 grain flow signal
S2 grain flow signal
S3 grain flow signal
S4 grain flow signal
S5 grain flow signal
S6 grain flow signal
S7 grain flow signal
S8 grain flow signal
J1 first control command signal
J2 second control command signal J3 third control command signal
R1 control signal
R2 control signal
R3 control signal
R4 control signal

What is claimed is:

1. A method for separating a crop flow on at least one conveying and cleaning unit, particularly a top sieve, of a combine harvester, comprising the following steps:
    exciting the conveying and cleaning unit to a longitudinal oscillation and a transverse oscillation,
    controlling the transverse oscillation depending on at least one state comprising an inclination of the combine harvester, and
    controlling the transverse oscillation depending on at least one further state that comprises grain purity,
    wherein the transverse oscillation is pre-controlled depending on the inclination of the combine harvester and fine-tuned depending on the grain purity.

2. The method for separating the crop flow according to claim 1, wherein the grain purity is determined by one or more first sensors.

3. The method for separating the crop flow according to claim 1, wherein the conveying and cleaning unit is acted upon by an active transverse oscillation during a work process on level ground as well as on a slope, wherein distance covered by the crop on the conveying and cleaning unit is actively lengthened by the transverse oscillation.

4. The method for separating the crop flow according to claim 1, wherein an additional further state for controlling the transverse oscillation comprises a transverse separation at one or more sieves of the conveying and cleaning unit.

5. The method for separating the crop flow according to claim 4, wherein the transverse separation is determined at an exit of a bottom sieve or the top sieve of the conveying and cleaning unit by one or more grain flow measuring devices.

6. The method for separating the crop flow according to claim 1, wherein the combine harvester is formed as axial rotor machine, wherein the axial rotor machine has at least one axial rotor and louvers which at least partially surround the at least one axial rotor, wherein an additional further state for controlling the transverse oscillation comprises an adjustment of the louvers, wherein the adjustment of the louvers is changed by the control depending on the at least one further state.

7. The method for separating the crop flow according to claim 1, wherein the control of the transverse oscillation is carried out automatically.

8. The method for separating the crop flow according to claim 1, wherein an additional further state for controlling the transverse oscillation comprises throughput of the crop flow.

9. An apparatus for separating a crop flow on at least one conveying and cleaning unit, particularly a top sieve, of a combine harvester, wherein the conveying and cleaning unit that is excited to a longitudinal oscillation and a transverse oscillation, comprising:
    one or more first sensors configured for determining grain purity, and
    a control unit configured for controlling the transverse oscillation depending on at least one state, wherein the at least one state for controlling the transverse oscillation is the inclination of the combine harvester,
    wherein the control unit is configured for controlling the transverse oscillation depending on at least one further state comprising the grain purity,
    wherein the control unit is configured to pre-adjust to a transverse oscillation reference value depending on the inclination of the combine harvester and subsequently, depending on the at least one further state, generate a control command signal with which the transverse oscillation of the conveying and cleaning unit is adjusted so that the grain purity lies within a defined tolerance range.

10. The apparatus for separating the crop flow according to claim 9, wherein the first sensors are formed as optical sensors for capturing a series of images of a through-going crop flow, wherein the optical sensors are arranged in a grain elevator.

11. The apparatus for separating the crop flow according to claim 9, wherein the combine harvester comprises at least one grain flow measuring device for determining the transverse separation, and the control unit is configured for controlling the transverse oscillation based on an additional further state comprising the transverse separation.

12. The apparatus for separating the crop flow according to claim 9, wherein the combine harvester is formed as an axial rotor machine, wherein the axial rotor machine has at least one axial rotor and louvers at least partially surrounding the rotor, and the control unit is configured for adjustment of the louvers.

13. The apparatus for separating the crop flow according to claim 12, wherein the control unit is configured to change the adjustment of the louvers depending on the at least one state or the at least one further state.

14. The apparatus for separating the crop flow according to claim 9, wherein the combine harvester has a throughput measuring device in the form of a layer height roller arranged in a feed conveyor of the combine harvester, for determining throughput of the crop flow, and the control unit is configured to controlling the transverse oscillation depending on an additional further state comprising the throughput of the crop flow.

* * * * *